(12) United States Patent
Yin et al.

(10) Patent No.: US 7,237,454 B2
(45) Date of Patent: Jul. 3, 2007

(54) ANY GEAR START HORIZONTAL ENGINE FOR MOTORCYCLE

(75) Inventors: Mingshan Yin, Chongqing (CN); Li Li, Chongqing (CN); Bo Dai, Chongqing (CN)

(73) Assignee: Chongqing Lifan Industry (Group) Co., Ltd., Chongqing (CN)

( * ) Notice: Subject to any disclaimer, the term of this patent is extended or adjusted under 35 U.S.C. 154(b) by 223 days.

(21) Appl. No.: 11/044,302

(22) Filed: Jan. 28, 2005

(65) Prior Publication Data

US 2005/0193845 A1 Sep. 8, 2005

(30) Foreign Application Priority Data

Mar. 5, 2004 (CN) .................. 2004 1 0021967

(51) Int. Cl.
*F16H 37/06* (2006.01)
(52) U.S. Cl. .............. 74/665 R; 74/665 B; 74/333
(58) Field of Classification Search ............ 74/333, 74/665 B, 665 R, 721
See application file for complete search history.

(56) References Cited

U.S. PATENT DOCUMENTS

| | | | | |
|---|---|---|---|---|
| 5,038,731 A | * | 8/1991 | Shimada | 123/192.2 |
| 6,763,796 B2 | * | 7/2004 | Suzuki et al. | 123/195 R |

* cited by examiner

*Primary Examiner*—Ha Ho
(74) *Attorney, Agent, or Firm*—Armstrong, Kratz, Quintos, Hanson & Brooks, LLP

(57) ABSTRACT

An any-gear-start horizontal engine for a motorcycle, including a crankshaft having a drive gear, a main shaft having a clutch platen, a clutch driven plate and a clutch housing, a clutch driven gear is mounted on the clutch housing, the clutch driven gear engaging with the drive gear, and a starting shaft extending into a right crankcase through a right crankcase cover. An idle gear rotates freely on right end of a countershaft, the idle gear, and engages with a starting gear which rotates freely on the starting shaft. The main shaft has a spline rotating freely thereon, the spline connects the clutch housing through a spline slot, and the spline engages with the idle gear. This type of engine can be restarted after being shut off without having to shift back to neutral, so it is more effort saving and convenient.

2 Claims, 1 Drawing Sheet

ANY GEAR START HORIZONTAL ENGINE FOR MOTORCYCLE

FIELD OF THE INVENTION

The invention relates to an engine and, in particular, to a horizontal engine for a motorcycle that can be started with gear shifter in any position.

BACKGROUND OF THE INVENTION

Nowadays, 50~150 ml small displacement, rear-positioned, manual-clutch horizontal engines are widely used on motorcycles, cub motorcycles and motor tricycles. When the engine starts, the starting gear on the starting shaft rotates the first gear on the main shaft through the idle gear on the countershaft, the first-gear rotates the main shaft, the main shaft rotates the driven gear on the clutch housing, the driven gear then rotates the drive gear on the crankshaft, and thus the engine is started. However, when this series engine shuts off and re-starts, it needs to change to neutral first, that is, to engage the first gear on the main shaft with the idle gear on the countershaft again. Limited by the present structure of the main shaft and countershaft, the user is required to move the motorcycle back and forth to facilitate downshifting, thus it brings great inconvenience for the user in practice, especially for the user of motor tricycle. Because the deadweight of the motor tricycle is heavy, it is effort consuming and very inconvenient for the user to move back and forth.

SUMMARY OF THE INVENTION

The purpose of the invention is to provide an any gear start horizontal engine for motorcycle, so as to solve the problem that, when the motorcycle horizontal engine re-starts after being shut off it needs to first return to the neutral, in order to return the engine to neutral it needs to move the motorcycle back and forth, which is effort consuming and inconvenient.

The technical solution of the present invention is as follows: an any gear start horizontal engine for motorcycle, comprising in a crankcase a crankshaft, a main shaft, a countershaft and a starting shaft, wherein the crankshaft has a drive gear, the main shaft has a clutch platen, a clutch driven plate and a clutch housing, a clutch driven gear is mounted on the clutch housing, the clutch driven gear engages with the drive gear, the starting shaft extends into a right crank case through a right crank case cover, wherein that an idle gear rotates freely on the right end of the countershaft, the idle gear engages with the starting gear which idles on the starting shaft, the main shaft has a spline rotating freely thereon, the spline connects the clutch housing through a spline slot, and the spline engages with the idle gear.

In the present invention, when the engine with a gear shifter in any position restarts after being shut off, the gears of certain shift are engaged between the main shaft and the countershaft. First separate the clutch platen from the clutch driven plate, rotates the starting shaft, the starting gear on the starting shaft rotates the spline on the main shaft through the idle gear of the countershaft, the spline connects the clutch housing through spline slot, thus the spline rotates the clutch driven gear as well, the clutch driven gear then rotates the crankshaft through the drive gear to start the engine. Because the spline and the idle gear respectively rotate on the main shaft and countershaft freely, when the engine starts, the main shaft and countershaft won't synchroniz- ingly rotate with the spline and idle gear. Thus, re-start the engine with gear in any position can be achieved.

The advantage of the invention is that: the engine can be re-started after being shut off without shifting backing to the neutral first, which is effort saving and convenient in use.

DETAILED DESCRIPTION OF THE PREFERRED EMBODIMENT

Figure 1:
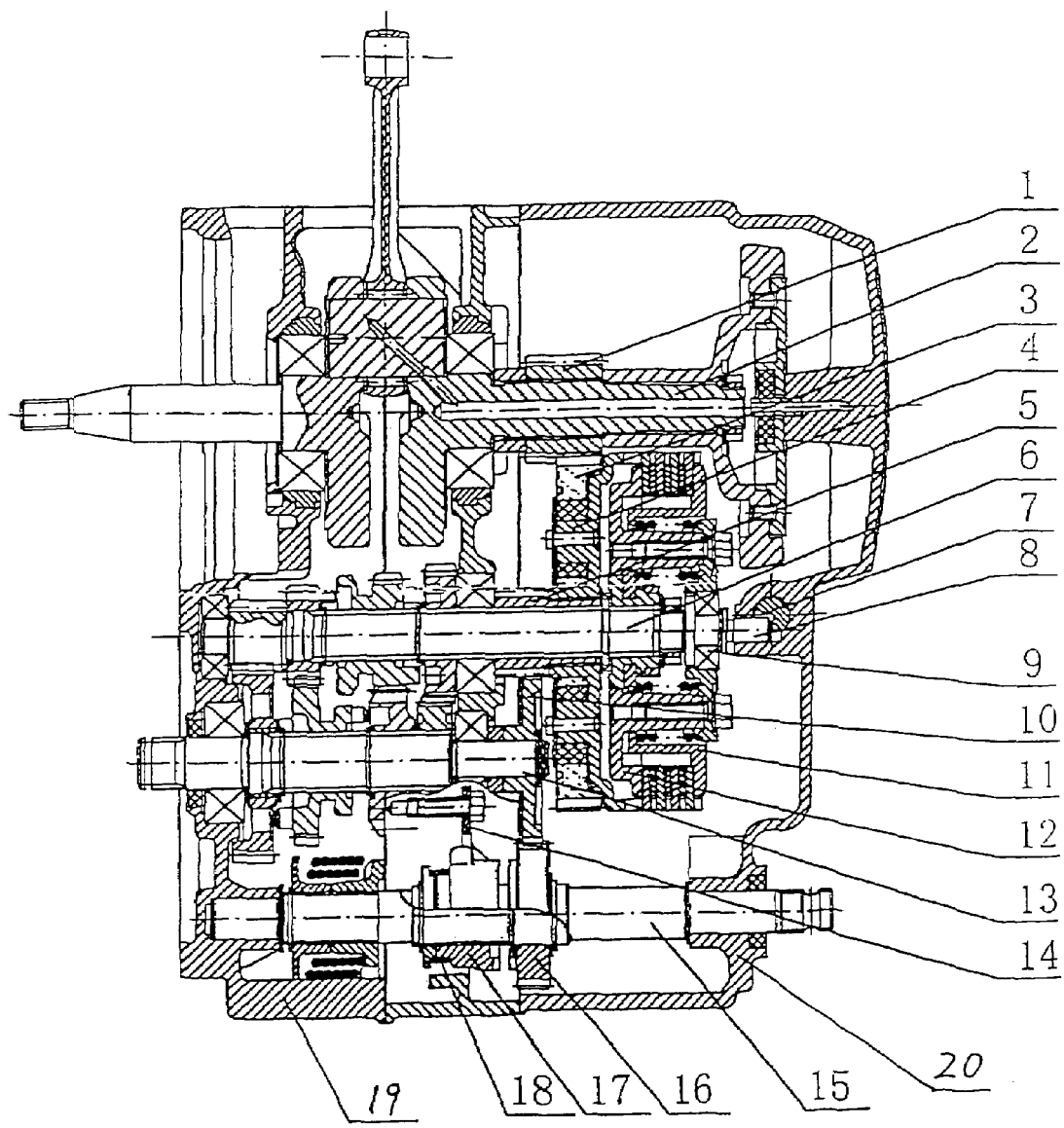
FIG. 1 is a schematic structure view of the present invention.

In FIG. 1, each label indicates: 1 drive gear, 2 crankshaft, 3 driven gear, 4 clutch housing, 5 spline, 6 main shaft, 7 clutch separating cam, 8 pushing rod, 9 clutch separating bearing, 10 idle gear, 11 clutch driven plate, 12 clutch platen, 13 countershaft, 14 ratchet guide, 15 starting shaft, 16 starting gear, 17 ratchet, 18 ratchet spring, 19 right crankcase, 20 right crankcase cover, 21 ratchet spring base.

Referring to FIG. 1, according to the invention, crankshaft 2 has a drive gear 1, main shaft 6 has a clutch platen 12, a clutch driven plate 11 and a clutch housing 4, a clutch driven gear 3 is mounted on the clutch housing 4, the clutch driven gear 3 engages with the drive gear 1, the starting shaft 15 extends into right crankcase 19 through right crankcase cover 20, wherein idle gear 10 rotates freely on the right end of countershaft 13, the idle gear 10 engages with starting gear 16 which idles on starting shaft 15, main shaft 6 has a spline 5 rotating freely thereon, the spline 5 connects the clutch housing 4 through a spline slot, and the spline 5 engages with the idle gear 10.

As can be seen from FIG. 1, a ratchet 17 is mounted on the starting shaft 15 through the spline slot, a ratchet spring 18 is placed between the ratchet 17 and ratchet spring base 21, a ratchet guide 14 is disposed above the ratchet 17, and the ratchet guide 14 engages with the ratchet 17.

The operation principle is that: when the engine is to be re-started at a certain gear after being shut off, first press down the handlebar, the clutch separating cam 7 rotates the pushing rod 8 to press the clutch separating bearing 9, so as to separate the clutch driven plate 11 from the clutch platen 12; at this time, step on the starting lever to rotate the starting shaft 15, which disengages the ratchet 17 from the ratchet guide 14, under the action of the ratchet spring 18 the ratchet 17 slides along the starting shaft 15 until it engages with the starting gear 16, the starting gear 16 is then synchronized rotating with the starting shaft 15; the starting gear 16 rotates the idle gear 10 engaged therewith, the idle gear 10 rotates the spline 5 engaged therewith, since the spline 5 and the clutch driven gear 3 on the clutch housing 4 are integrated into one synchronized part, and this part rotates freely on the main shaft 6, the clutch driven gear 3 is synchronized rotating with the spline 5; at this time, the main shaft and countershaft remain stationary, the clutch driven gear 3 rotates the drive gear 1 engaged therewith, the drive gear 1 is fixed on the crankshaft 2, and thus the crankshaft 2 is brought to rotate and the motorcycle is started.

We claim:

1. An any gear start horizontal engine for motorcycle, comprising a crankshaft, a main shaft, a countershaft, a starting shaft and a transmission gear; the crankshaft has a drive gear, the main shaft has a clutch platen, a clutch driven plate and a clutch housing, a clutch driven gear is mounted on the clutch housing, the clutch driven gear engages with the drive gear, the starting shaft extends into the right crankcase through the right crankcase cover, wherein an idle gear rotates freely on right end of the countershaft, the idle gear engages with a starting gear which idles on the starting shaft, the main shaft has a spline rotating freely thereon, the spline engages with a first spline slot to the clutch housing, and the spline engages with the idle gear.

2. The any gear start horizontal engine for motorcycle according to claim 1, wherein a ratchet is mounted on the starting shaft through a second spline slot, a ratchet spring is placed between the ratchet and a ratchet spring base, a ratchet guide is disposed above the ratchet, and the ratchet guide engages with the ratchet.

* * * * *

UNITED STATES PATENT AND TRADEMARK OFFICE
CERTIFICATE OF CORRECTION

PATENT NO. : 7,237,454 B2  
APPLICATION NO. : 11/044302  
DATED : July 3, 2007  
INVENTOR(S) : Yin et al.

Page 1 of 1

It is certified that error appears in the above-identified patent and that said Letters Patent is hereby corrected as shown below:

On the Title page, item

(30) Foreign Application Priority Data

"Mar. 5, 2004 (CN)............2004 1 0021967" should read:

--Mar. 5, 2004 (CN)...........2004 1 00219674--.

Signed and Sealed this

Thirteenth Day of November, 2007

JON W. DUDAS  
*Director of the United States Patent and Trademark Office*